United States Patent Office 2,762,835
Patented Sept. 11, 1956

2,762,835

PREPARATION OF AMINO NITRILES

Jack Swerdloff, East Orange, N. J., assignor to Celanese Corporation of America, New York, N. Y., a corporation of Delaware No Drawing. Application March 12, 1953,
Serial No. 342,020

15 Claims. (Cl. 260—465.5)

This invention relates to the preparation of amino nitriles and relates more particularly to the preparation of monoamino nitriles by the hydrogenation of dinitriles.

One method which has been employed for the production of aminonitriles has involved reacting an aliphatic dinitrile with hydrogen under pressure in the presence of a cobalt or nickel catalyst and stopping this reaction when the amount of hydrogen taken up is equal to that required by the equation for the half hydrogenation of the dinitrile, i. e. two moles of hydrogen for every mole of dinitrile in the reaction mixture. This method has resulted in comparatively low yields of the aminonitrile relative to the amounts of dinitrile used up in the reaction.

It is an object of this invention to provide a novel and efficient process for the production of aminonitriles in superior yields.

Other objects of this invention will appear from the following detailed description and claims.

According to my invention, aminonitriles are produced by reacting a dinitrile with hydrogen in the presence of an organic solvent for the dinitrile and stopping the reaction before more than 65%, preferably 60% or less, of the original amount of dinitrile has reacted.

One method of practicing my invention involves subjecting a solution of the dinitrile to hydrogen gas under pressure in the presence of a hydrogenation catalyst, most desirably a hydrogenation catalyst of the ferrous metal group, such as Raney nickel, and also in the presence of anhydrous ammonia. This reaction may be carried out conveniently by partially filling an autoclave with the dinitrile, catalyst, ammonia and organic solvent, supplying thereto an excess of hydrogen gas under pressure and sealing and agitating the autoclave. Due to the consumption of part of the hydrogen gas during the reaction, the pressure in the autoclave diminishes as the reaction proceeds. In another method, the pressure in the autoclave is maintained at a substantially constant value throughout the duration of the reaction by continuously supplying hydrogen gas from a suitable external source to the reactants while the reaction is going on.

While the pressure at which the hydrogenation reaction may be conducted can be varied over a wide range, I have found that optimum results are obtained when the pressure is relatively low. Thus, pressures of about 500 to 1500 pounds per square inch gauge have been found to be most suitable, with the best yields of monoamino nitrile being obtained at pressures of about 1000 pounds per square inch gauge or less.

The temperature at which the hydrogenation reaction is carried out can also be varied over a considerable range. However, best results have been obtained at temperatures of about 90° to 130° C. with the higher temperatures effecting more rapid rates of reaction.

As previously stated, the reaction is carried out in the presence of a solvent for the dinitrile, suitable solvents being, for example, methylal, which is preferred, dioxane, tetrahydrofurane or methyl cyclohexane. The amount of solvent should be sufficient to provide a relatively dilute solution, i. e. a solution in which the ratio of solvent to dinitrile, by weight, is at least about 1:1, e. g. from about 1:1 to about 3:1. The solvent should, of course, be substantially inert to hydrogen under the conditions of reaction.

The hydrogenation catalyst, such as nickel or cobalt, may be employed as such or supported on suitable materials. The process of my invention makes it possible to obtain high yields of aminonitrile with relatively cheap and readily available catalysts, such as Raney nickel, without the necessity of using specially prepared catalysts. The amount of catalyst, and also of ammonia, may be varied considerably.

The hydrogenation reaction is terminated, in any convenient manner, when tests show that the desired amount of the dinitrile has reacted and while at least 35%, preferably at least 40%, of the dinitrile originally present remains unreacted. For example, the reaction may be stopped by stopping the agitation of the reaction mixture. For practical purposes at least about 40% of the dinitrile should be reacted before the hydrogenation is terminated. After the reaction is finished, an appreciable amount of unreacted dinitrile, i. e. 35% or more of the dinitrile originally present, appears in the final product. This unreacted dinitrile may be separated in any suitable manner, such as by distillation or extraction, from the aminonitrile and other constituents of the product and then again employed in the hydrogenation reaction of my invention.

Among the dinitriles which may be used in the process of my invention are, for example, succinonitrile, adiponitrile, pimelonitrile, azelaonitrile, suberonitrile, beta-methyl adiponitrile, beta-amyl adiponitrile, brassylonitrile, 1,9 dicyanononane, 1,10-dicyanodecane, or 1,18-dicyano octadecane. For optimum results it is preferred to employ aliphatic dinitriles having at least 4 carbon atoms between the nitrile groups.

In order further to illustrate my invention but without being limited thereto, the following examples are given.

*Example I*

108 parts by weight of adiponitrile, 31 parts by weight of Raney nickel catalyst wet with methylal, 178 parts by weight of methylal and 158 parts by weight of anhydrous liquid ammonia are charged into a stainless steel autoclave. This charge occupies 55% of the volume of the autoclave. The remainder of the autoclave is then filled with hydrogen gas under a pressure sufficient to yield a pressure of 1000 pounds per square inch gauge when the autoclave is closed and heated to a temperature of 101° C. The autoclave is then sealed, heated to 101° C., and agitated for 4 minutes, during which time the pressure therein drops from 1000 pounds per square inch gauge to about 700 pounds per square inch, after which the autoclave is vented to relieve the pressure. The liquid product of the reaction is fractionated under vacuum to separate out 5.3 parts of hexamethylene diamine, 48.4 parts by weight of unreacted adiponitrile and 51.5 parts of 6-amino-capronitrile, which represents an 84% yield of amino-capronitrile based on the total amount of adiponitrile consumed in the reaction.

*Example II*

Example I is repeated with the exception that 122 parts by weight of pimelonitrile is substituted for the adiponitrile and the temperature is maintained at 99° C. The reaction is somewhat slower, requiring about 30 minutes for 50% of the pimelonitrile to be reacted. 61 parts by weight of unreacted pimelonitrile and 42 parts by weight of 7-amino-heptanonitrile are recovered, representing a yield of 66% of 7-amino-heptanonitrile based on the amount of pimelonitrile used up in the reaction.

It is to be understood that the foregoing detailed description is given merely by way of illustration and that many variations may be made therein without departing from the spirt of my inventon.

Having described my invention, what I desire to secure by Letters Patent is:

1. Process for the production of aminonitriles from dinitriles, which comprises reacting an aliphatic dinitrile with hydrogen under pressure in the presence of an organic solvent that is substantially inert to hydrogen under the conditions of reaction and a hydrogenation catalyst, and terminating the reaction after at least about 40% and before more than 65% of the dinitrile originally present is reacted.

2. Process for the production of aminonitriles from dinitriles, which comprises reacting an aliphatic dinitrile with hydrogen under pressure in the presence of an organic solvent that is substantialy inert to hydrogen under the conditions of reaction and a hydrogenation catalyst, the ratio of solvent to dinitrile being at least about 1:1, and terminating the reaction after at least about 40% and before more than 65% of the dinitrile originally present is reacted.

3. Process for the production of aminonitriles from dinitriles, which comprises reacting an aliphatic dinitrile with hydrogen under a pressure of about 500 to about 1500 pounds per square inch at a temperature of about 90 to 130° C. in the presence of an organic solvent that is substantially inert to hydrogen under the conditions of reaction and a hydrogenation catalyst, the ratio of solvent to dinitrile being at least about 1:1, and terminating the reaction after at least about 40% and before more than 65% of the dinitrile originally present is reacted.

4. Process for the production of amnionitriles from dinitriles, which comprises reacting an aliphatic dinitrile with hydrogen under a pressure of about 500 to about 1500 pounds per square inch in the presence of an organic solvent that is substantially inert to hydrogen under the conditions of reaction, anhydrous ammonia, and a Raney nickel hydrogenation catalyst, the ratio of solvent to dinitrile being at least about 1:1, and terminating the reaction after at least about 40% and before more than 65% of the dinitrile originally present is reacted.

5. Process for the production of aminocapronitrile from adiponitrile, which comprises reacting adiponitrile with hydrogen in the presence of an organic solvent that is substantially inert to hydrogen under the conditions of reaction, and terminating the reaction after at least about 40% and before more than 65% of the adiponitrile originally present is reacted.

6. Process for the production of aminocapronitrile from adiponitrile, which comprises reacting adiponitrile with hydrogen under pressure in the presence of an organic solvent that is substantially inert to hydrogen under the conditions of reaction and a hydrogenation catalyst, and terminating the reaction after at least about 40% and before more than 65% of the adiponitrile originally present is reacted.

7. Process for the production of aminocapronitrile from adiponitrile, which comprises reacting adiponitrile with hydrogen under pressure in the presence of an organic solvent that is substantially inert to hydrogen under the conditions of reaction and a hydrogenation catalyst, the ratio of solvent to adiponitrile being at least about 1:1, and terminating the reaction after at least about 40% and before more than 65% of the adiponitrile originally present is reacted.

8. Process for the production of aminocapronitrile from adiponitrile, which comprises reacting adiponitrile with hydrogen under a pressure of about 500 to about 1500 pounds per square inch at a temperature of about 90 to 130° C. in the presence of an organic solvent that is substantially inert to hydrogen under the conditions of reaction and a hydrogenation catalyst, the ratio of solvent to adiponitrile being at least about 1:1, and terminating the reaction after at least about 40% and before more than 65% of the adiponitrile originally present is reacted.

9. Process for the production of aminocapronitrile from adiponitrile, which comprises reacting adiponitrile with hydrogen under a pressure of about 500 to about 1500 pounds per square inch in the presence of an organic solvent that is substantially inert to hydrogen under the conditions of reaction and a Raney nickel hydrogenation catalyst, the ratio of solvent to adiponitrile being at least about 1:1, and terminating the reaction after at least about 40% and before more than 65% of the adiponitrile orginally present is reacted.

10. Process for the production of aminoheptanonitrile from pimelonitrile, which comprises reacting pimelonitrile with hydrogen in the presence of an organic solvent that is substantially inert to hydrogen under the conditions of reaction, and terminating the reaction after at least about 40% and before more than 65% of the pimelonitrile originally present is reacted.

11. Process for the production of aminoheptanonitrile from pimelonitrile, which comprises reacting pimelonitrile with hydrogen under pressure in the presence of an organic solvent that is substantially inert to hydrogen under the conditions of reaction and a hydrogenation catalyst, and terminating the reaction after at least about 40% and before more than 65% of the pimelonitrile originally present is reacted.

12. Process for the production of aminoheptanonitrile from pimelonitrile, which comprises reacting pimelonitrile with hydrogen under pressure in the presence of an organic solvent that is substantially inert to hydrogen under the conditions of reaction and a hydrogenation catalyst, the ratio of solvent to pimelonitrile being at least about 1:1, and terminating the reaction after at least about 40% and before more than 65% of the pimelonitrile originally present is reacted.

13. Process for the production of aminoheptanonitrile, which comprises reacting pimelonitrile with hydrogen under a pressure of about 500 to about 1500 pounds per square inch at a temperature of about 90 to 130° C. in the presence of an organic solvent that is substantially inert to hydrogen under the conditions of reaction and a hydrogenation catalyst, the ratio of solvent to pimelonitrile being at least about 1:1, and terminating the reaction after at least about 40% and before more than 65% of the pimelonitrile originally present is reacted.

14. Process for the production of aminoheptanonitrile, which comprises reacting pimelonitrile with hydrogen under a pressure of about 500 to about 1500 pounds per square inch in the presence of an organic solvent that is substantially inert to hydrogen under the conditions of reaction and a Raney nickel hydrogenation catalyst, the ratio of solvent to pimelonitrile being at least about 1:1, and terminating the reaction after at least about 40% and before more than 65% of the pimelonitrile originally present is reacted.

15. Process for the production of aminonitriles from dinitriles, which comprises reacting an aliphatic dinitrile in which the nitrile groups are separated by at least 4 carbon atoms with hydrogen under a pressure of about 500 to about 1500 pounds per square inch at a temperature of about 90 to 130° C. in the presence of methylal and a Raney nickel hydrogenation catalyst, the ratio of methylal to dinitrile being at least 1:1, and terminating the reaction after at least about 40% and before more than 65% of the dinitrile originally present is reacted.

References Cited in the file of this patent

UNITED STATES PATENTS

| Number | Name | Date |
|---|---|---|
| 2,208,598 | Rigby | July 23, 1940 |
| 2,257,814 | Rigby | Oct. 7, 1941 |
| 2,292,949 | Lazier et al. | Aug. 11, 1942 |
| 2,418,441 | Whitman | Apr. 1, 1947 |
| 2,449,036 | Grunfeld | Sept. 7, 1948 |